Feb. 20, 1934.   O. E. HUEBNER   1,947,473
STORAGE BATTERY
Filed Dec. 10, 1929   4 Sheets-Sheet 1
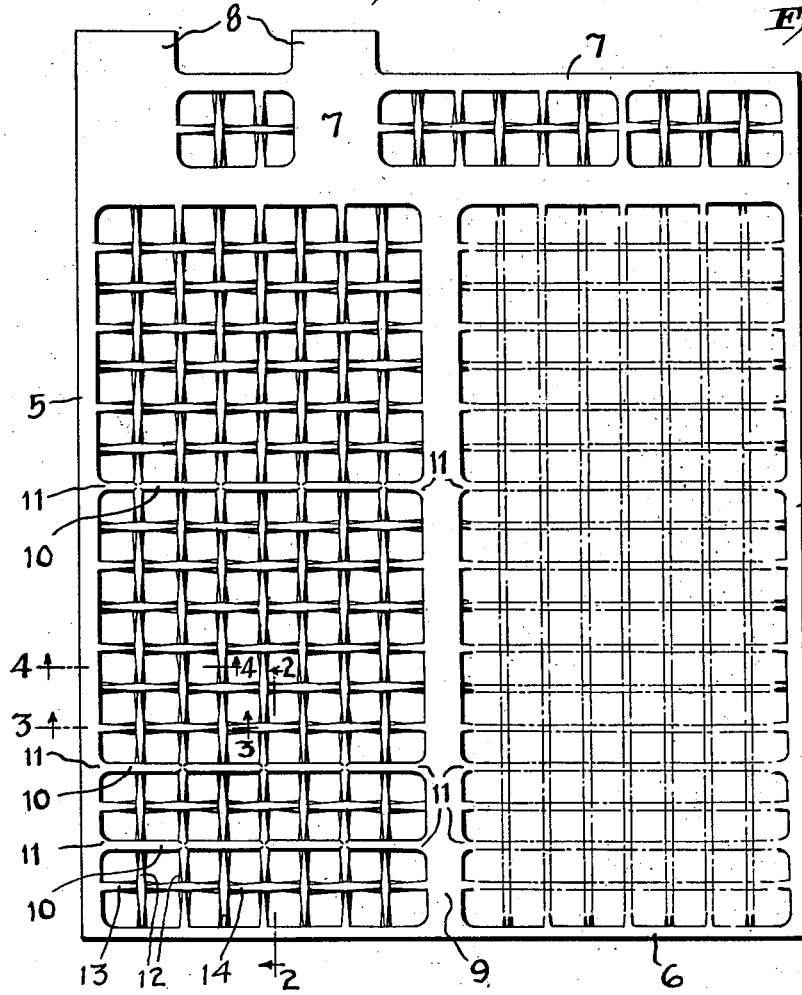
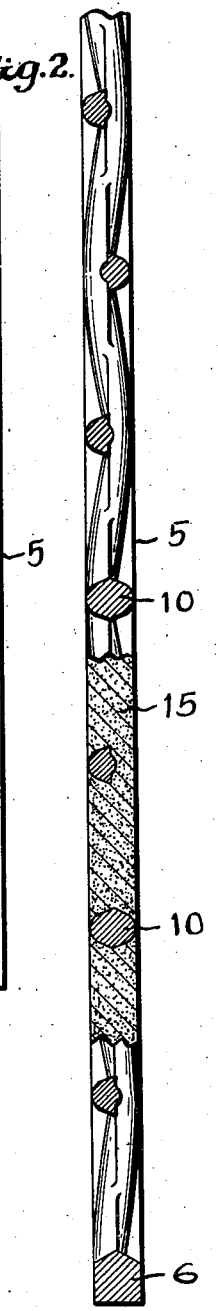
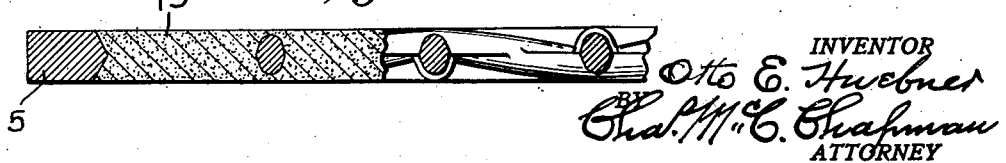
INVENTOR
Otto E. Huebner
BY Chas. M. C. Chapman
ATTORNEY Feb. 20, 1934. O. E. HUEBNER 1,947,473
STORAGE BATTERY
Filed Dec. 10, 1929 4 Sheets-Sheet 3

INVENTOR
Otto E. Huebner
BY Chas. M. C. Chapman
ATTORNEY

Feb. 20, 1934.     O. E. HUEBNER     1,947,473
STORAGE BATTERY
Filed Dec. 10, 1929     4 Sheets-Sheet 4

INVENTOR
Otto E. Huebner
BY
Chas. M. C. Chapman
ATTORNEY

Patented Feb. 20, 1934

1,947,473

UNITED STATES PATENT OFFICE

1,947,473

STORAGE BATTERY

Otto E. Huebner, Richmond Hill, N. Y., assignor, by mesne assignments, to Mechanical Development Corporation of America, a corporation of Delaware Application December 10, 1929
Serial No. 412,956

4 Claims. (Cl. 136—49)

This invention has reference to the art of storage batteries, and particularly relates to electrodes for use in storage batteries, and to the method of making said electrodes, grids or plates.

Among the objects of my invention may be noted the following: To provide an unusually thin electrode plate of considerably reduced weight and greatly increased capacity relative to volume for use in electric storage batteries; to provide a plate by casting or molding in dies, thus securing uniformity and lightness and bringing about economy in the use of the material employed; to provide a cast grid or plate for use in storage batteries, which can be produced with facility, is flexible, strong and durable, and on which the deposit of the amalgam or active paste may be uniformly distributed; to provide a battery plate such as outlined in the foregoing which has a greatly increased contact surface, and in which the paste or amalgam is interlocked with the bars of the grid structure of the plate; to provide a cast plate in which the foundation structure and the applied paste or amalgam are intimately interlocked with each other, and from which the amalgam cannot be readily shed, will not chip or readily break off, and which plate, by reason of the construction noted, is pliable and flexible, and can be bent and handled with impunity without chipping or flaking; and to provide a method of making battery plates of the character noted in the foregoing, which is simple and economical and gives to the product many advantages in addition to those suggested.

With the above objects in view, and others which will be detailed during the course of this description, my invention consists in the method and in the parts, features, elements and combinations thereof hereinafter described and claimed.

In order that my invention may be clearly understood, I have provided drawings wherein:

Figure 1 is a plan view of a form of battery grid or plate, embodying the features of my invention, the paste being omitted for clarity;

Figure 2 is a view showing an enlarged, sectional detail on the line 2—2 of Figure 1, a part of the section having the amalgam or paste applied to show the manner of interlocking and embedding the cross-bars;

Figure 3 is a view showing an enlarged sectional detail taken on the line 3—3 of Figure 1, the amalgam or paste being filled in;

Figure 4 is a view showing an enlarged sectional detail taken on the line 4—4 of Figure 1, the amalgam or paste being partly filled in;

Figure 5:
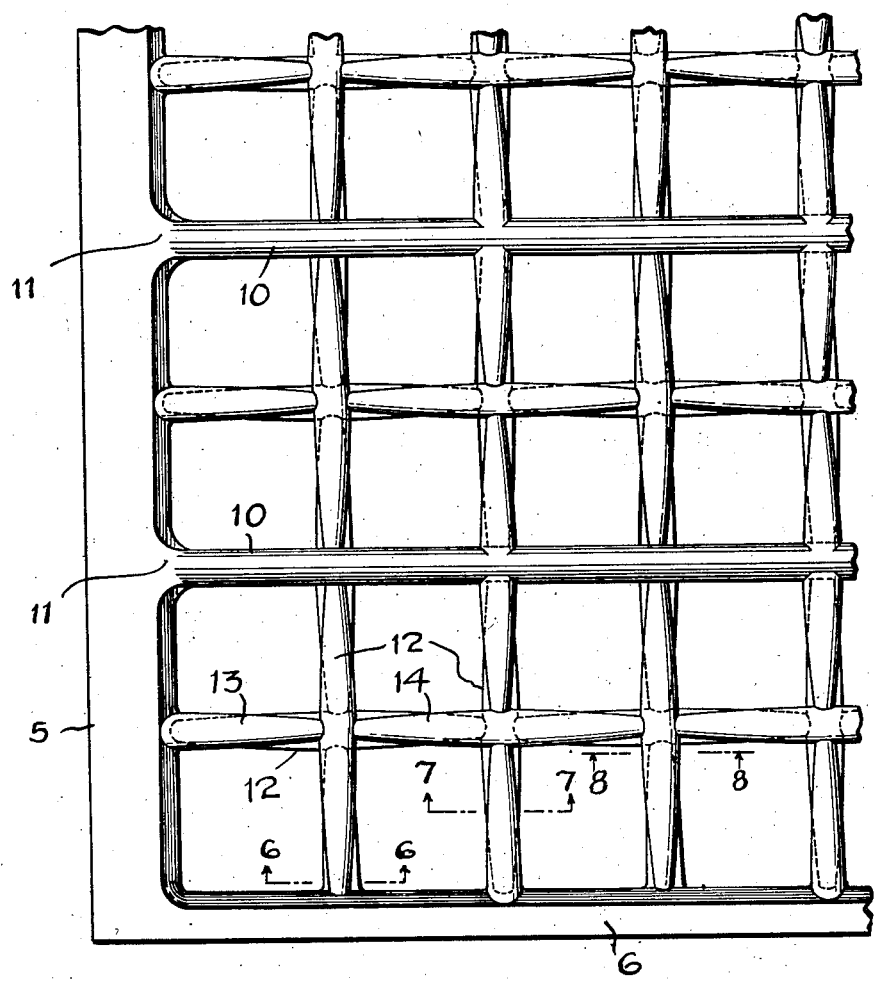
Figure 5 is a plan view showing one corner of the grid or battery plate of Figure 1, the view being greatly enlarged in order to bring out clearly the details of construction at the junction points of the cross-bars and also the characteristic features of the latter.
Figure 6:
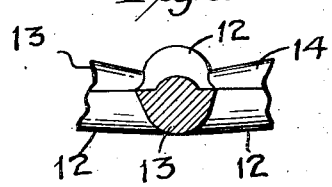
Figure 7:
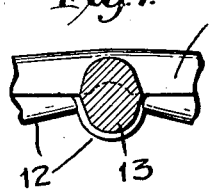
Figure 8:
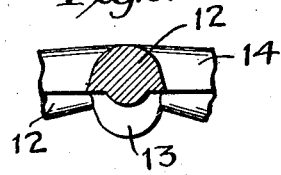
Figure 9:
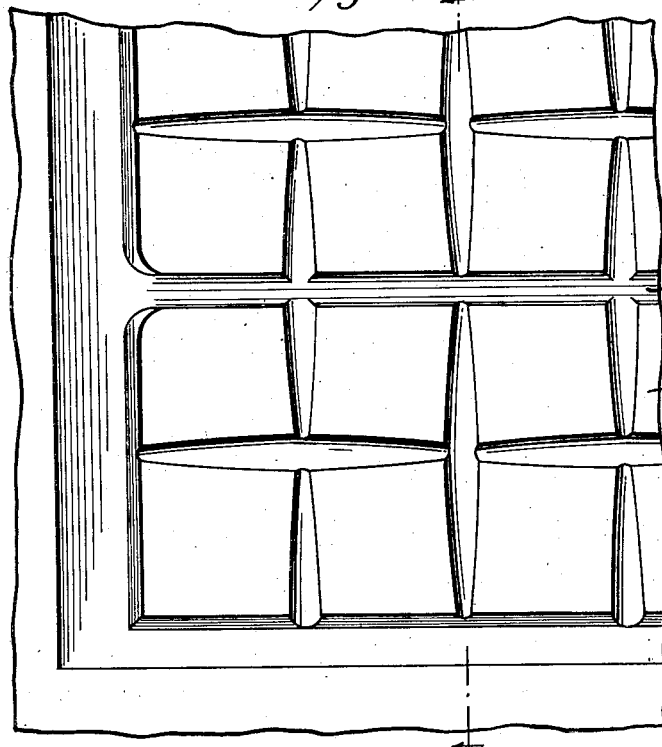
Figure 10:
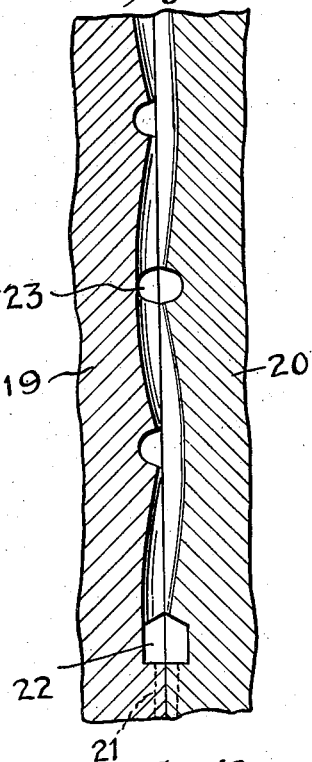
Figure 11:
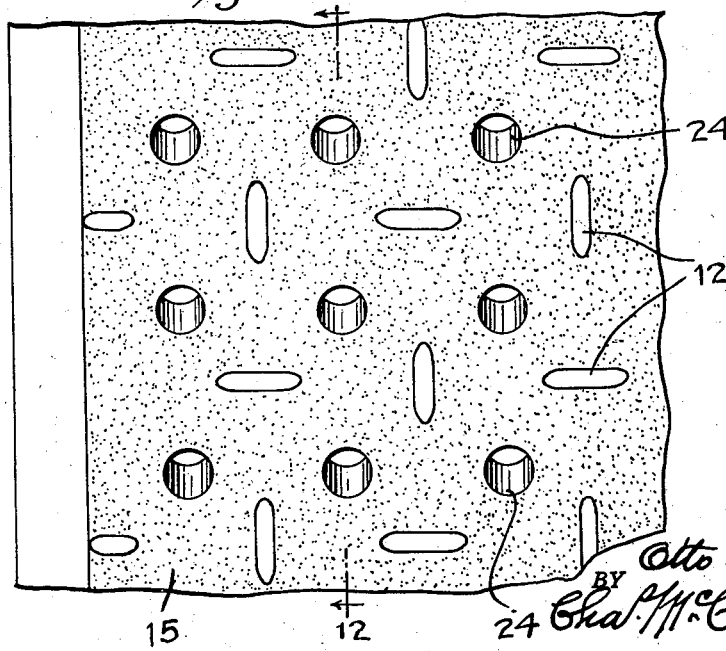
Figure 12:
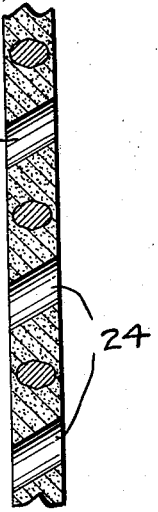
Figure 14:
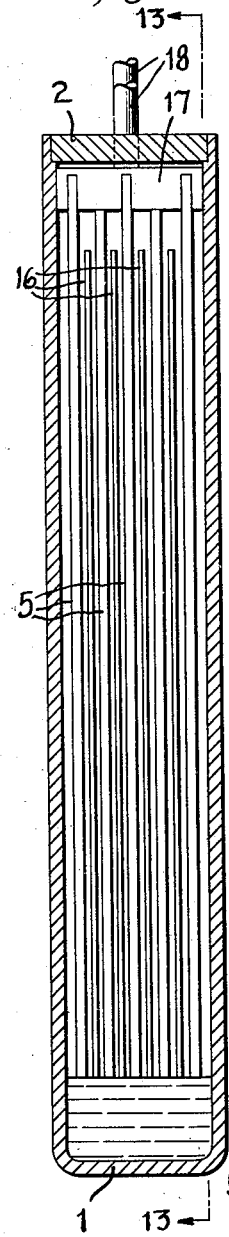
Figure 13:
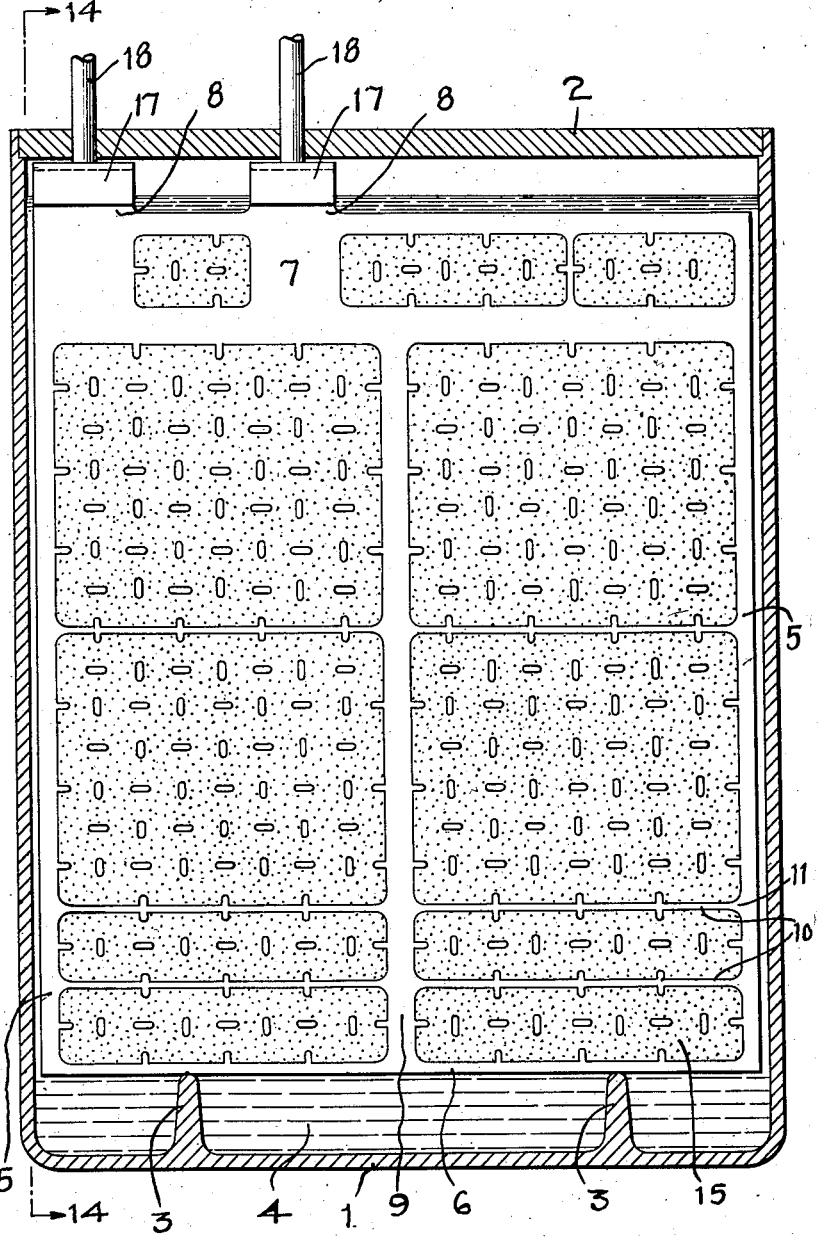

Figures 6, 7 and 8 are sectional views showing details, respectively, on the lines 6—6, 7—7 and 8—8 of Figure 5;

Figure 9 is a plan view showing one corner of the mold enlarged, details of construction being shown by means of which the battery plate or grid is produced;

Figure 10 is a sectional detail of the two cooperating mold plates as if taken on the line 10—10 of Figure 9;

Figure 11 is a plan view enlarged of a grid or battery plate made according to my invention showing another form of the latter;

Figure 12 is a sectional view taken on the line 12—12 of Figure 11;

Figure 13 is a view showing, in sectional elevation on the line 13—13 of Figure 14, a plurality of battery plates or grids enclosed in a cell or casing, and embodying my invention; and Figure 14 is a view in sectional elevation taken on the line 14—14 of Figure 13.

Referring to the drawings, Figures 13 and 14, the numeral 1 indicates a cell or receptacle for the plates or grids, which may be of any suitable form, and which is usually composed of a non-conducting material not susceptible to the attack of acids, and which is usually of rectangular shape having a cover 2 sealing the same to prevent splash and wastage. The cell is or may be provided with transverse ribs 3 on which the grids or plates may rest, and below which and between the ribs a sump 4 is produced for the collection of sediment.

The battery plates, of Figures 1 to 8, may be produced by casting within two cooperating molds, presently described, and thus produced have the following characteristics: A rectangular frame the sides 4 of which are narrow, the bottom 6 of which may be slightly less substantial, and the top 7 of which is given a substantial, wide, more or less solid bar which is extended near one side to provide lugs 8 for the circuit connection. The body of the plate, together with a part of the top bar, is composed of a grid-like structure having the semblance of wire-mesh, this body structure being cast integral with the frame bars. The body structure is formed so as to produce the appearance of wire bars crossing each other. Additionally, the body structure is provded with stay or brace bars which are so disposed as to give strength and rigidity to the plate as a whole, these brace bars being uniform in shape and having the appearance of being extended in continuity with the side bars and the center bar 9. The brace-bars are indicated at 10, and their junction with the bars 5 and 9 is shown at 11. The brace-bars are disposed so as to have the greatest strengthening effect; that is to say, two of them are arranged below the transverse middle of the plate because the lower frame bar 6 is not of great strength as compared with the top frame bar, the strength of which renders it unnecessary to place a brace-bar 11 any nearer the top of the plate than shown in Figure 1, viz., just above the transverse center.

The body structure will be best understood by referring to a section thereof between two brace-bars 10, or the bottom bar 6 and adjacent brace-bar, as shown in Figures 6, 7, 8. Therein it will be seen that, by casting the plates in the molds of Figures 9 and 10, I have produced a plurality of merging cross-figures each consisting of bars mushrooming into and autogeneously bonded to each other at their junction points and to the rectangular frame and having the structure shown in Figures 5 to 8, inclusive; that is to say, each figure, within a given area, is composed of a pair of cross-bars of duplex form arranged at a right-angle to each other. Each bar is continuous on one surface 12, and on the other surface is divided into two parts 13 and 14, having the appearance of abutting against the continuous member 12 of the other bar, the bars and their members being, however, integral because cast in one. Each bar 12 tapers from the center to its opposite end, and the two parts 13 and 14 are reversely tapered. Considering an adjacent cross-figure, a continuous member 12 is disposed on the opposite face of the grid or plate, and the parts 13 and 14 are opposed to said continuous member and form part of another continuous member. At those points where the brace-bars 10 are disposed, they take the place of a cross-bar. Considering the cross-section of the members 12, 13 and 14, it will be seen, viewing Figures 6 to 8, that the compound bars, or members, at their outer ends are plano-convex with a central bulge, as in Figure 6. Viewing Figure 7, the part 14 is an integral part of a continuous member, and the bar at the point of cross-section is approximately elliptical. Viewing Figure 8, the conditions and form of the bar are reversed as compared with Figure 6. As before stated, all these parts and members are formed integral by casting in dies.

The foregoing structure produces a mesh-like plate or grid the members of which are greatly reinforced and strengthened. This formation extends throughout the grid and each unit or cross-structure is extended into, or merged with, and is integral with, the adjacent units.

The structure of the body of the grid thus composed enables the application of the paste or amalgam or filling 15 for the plate to be most intimately associated with the cross-bar units and interlocked therewith on both faces; and the application of the paste or amalgam is accomplished so as to cause its surface on opposite sides of the grid to be flush with the surfaces of the grid body at the prominent points. Or, as shown in Figures 2, 3 and 4, the amalgam, as applied to the opposite faces of the grid, is tangential to the surface of the latter where the prominent portions of the units occur.

A battery plate thus composed is strong and durable, very light, and can be made unusually thin, viz., about one-sixteenth ($\frac{1}{16}$) of an inch, and has many other advantages presently set forth. These battery plates are grouped in the usual way in the cell 1, and are alternately connected to the positive and negative leads of the circuit, through the medium of the lugs 8, and may be separated by sheets of material 16 having apertures pierced therethrough by high tension electrical discharges, as disclosed in my Patent #1,576,974, granted March 16, 1926. Groups of plates may be connected by bus-bars 17, having binding posts 18 shown broken away in Figures 13 and 14.

In Figures 9 and 10, I have shown a mold for producing the grid, said mold consisting of two members 19 and 20, having the necessary grooves and other facial characteristics for producing the desired conformation resembling a woven wire grid. The two members of the die are placed together face-to-face as shown in Figure 10, and are clamped together, by suitable means not shown, to prevent them from moving relatively; and the desired alloy is melted to a freely fluid state and poured through openings, as at 21, terminating in channels 22 at one side of the mold plates so that it may freely flow into the grooves and recesses between the plates, as clearly indicated in Figure 10. When the alloy has sufficiently set and the plates have sufficiently cooled, they are separated and the grid of Figure 1 is removed therefrom. The marginal channels 22, between the members, produce, respectively, side bars, the bottom bar and the top extension bars; and, if desired, continuous brace-bar reinforcements may be provided for by producing channels 23 across the face of the molds, thus providing the continuous bars 10 in sufficient number to give bodily strength, in combination with the side bars, bottom and top bars. The grooves in the molds are of the conformation required to produce the desired grid-structure.

In the form of my invention shown in Figures 11 and 12, I may produce diagonal openings 24 transversely through the paste or amalgam and through the openings between the cross-bars of the body structure. This will enable the exposure of a greater conducting surface to the electrolyte and will also provide for the circulation of the electrolyte and freer passage of the current.

From the foregoing it will be seen that I have invented a method or process of forming electric battery grids by casting, which is economical, speedy and effective, and that the product of the method has the following advantages:

It should be understood that an ideal electric storage battery is one consisting of plate surface only; that is to say, a battery having plates comprising, theoretically, all surface and no thickness, immersed in the solution, because the capacity of the battery or the maxium amount of current which can be drawn from the battery, depends principally upon the amount of surface in actual contact with the solution. I have attained, with my battery plate or grid, the closest approximation known to me to the ideal, because my battery plate or grid can be made exceedingly thin,—not over one sixteenth ($\frac{1}{16}$) of an inch,—is very light and, for the same capacity or same weight, is far lighter than any known to me. By my structure and the mode of making the same, the cost of production is greatly reduced. My battery plate is flexible, very durable and much stronger than any of the plates of the same weight, size and thickness now on the market or known to me. By my construction diffusivity is greatly increased and the contact surface of the paste and grid is also increased. The paste or amalgam is intimately interlocked with the cross-bar units of the grid structure, and the amalgam, by being interlocked with the units of the grid, does not chip or shed or break off even when the plates are bent or flexed, because the amalgam is intimately interwoven with the bars of the grid structure. By my mode of construction expansion stresses are greatly reduced, if not entirely eliminated, and temperature differences are avoided and local thermal potentials are prevented. The ampere hour output of my plate is increased for the same volume and weight of the paste or amalgam employed. Mechanical strength and lightness are necessary essentials of my grid, due to its arched and interlocking features of construction, including its integrality of mesh as the result of casting, in contradistinction to the woven wire or braided structure of the usual battery grids. The reduced dimensions, including the thickness of the plate, enable a greater quantity of electrolyte to be used in a given cell space, thus increasing longevity of the cells. In the use of my battery plates, a slow drop of voltage curve is discernible during discharge for the same ampere rating; and the total efficiency of the plates and battery as a whole is greatly increased. An important feature of improvement and great advantage of my structure is that the plate or grid is produced by casting between molds into which the fluid metal is poured, the molds being devoid of cores. This is important from the standpoint of economy, simplicity of production, ease and manipulation of the molds, and facility with which the grid is made and removed from the molds; and an important feature of my grid plate, when produced, resides in the characteristic that its bars are sinuous in form transversely of each other, having high and low points on opposite surfaces of the grid, the amalgam being in effect a solid mass the surfaces of which are tangent to and flush with the high parts or crowns of the curvatures. Another important characteristic of my grid is that the cast structure and the amalgam, paste or filling substance are so interlocked as to constitute a homogeneous, integral mass.

Having thus described my invention, what I claim and desire to secure by Letters Patent is:

1. A plate for electrical storage batteries comprising an outer frame lying substantially in one plane, a plurality of cross-bars extending from one side of the frame to the other; a plurality of cross-bars intersecting the aforesaid cross-bars, each cross-bar weaving back and forth from one face of the plate to the other face and having bulges which extend to a plane lying approximately in the outer surface of the plate, the intersecting cross-bars weaving first under and then over adjacent bars and being united integrally at the junction points to produce an integral structure, a mass of active paste filling the spaces between the intersecting cross-bars and the troughs in the cross-bars which alternate from one face of the plate to the other whereby the entire mass of paste is interlocked to the cross-bars to give a flexible, strong and durable structure, and a lug operatively associated with the frame for connecting electrically the paste via said cross-bars to an external circuit.

2. A plate for electrical storage batteries comprising a relatively thin outer frame having a substantially rectangular shape, a plurality of spaced horizontal cross-bars extending from one side of said frame to the other, a plurality of spaced vertical cross-bars extending from the bottom to the top of said frame, each cross-bar weaving back and forth from one face of the plate to the other and passing under and over adjacent intersecting cross-bars, the horizontal and vertical cross-bars being united at their points of intersection to form an integral structure, a mass of active paste filling the spaces between the horizontal and vertical cross-bars and filling the troughs in the cross-bars which alternate back and forth from one face of the plate to the other thereby providing a substantially uniform distribution of paste which is interlocked with the cross-bars to produce a flexible, strong and durable plate, and a lug operatively associated with the frame for establishing an electrical connection between the active paste via the cross-bars to an external circuit.

3. A relatively thin integral plate of leaden material for storage batteries comprising a rectangular frame having a relatively heavy top and relatively narrow sides and bottom, a vertical brace bar extending from the top to the bottom of said frame and dividing the same into two rectangular spaces, a lattice member filling each of said rectangular spaces and being formed integrally with the frame and the brace bar, the lattice member consisting of a plurality of spaced horizontal cross-bars and a plurality of spaced vertical cross-bars, each cross-bar weaving back and forth from one face of the plate to the other and passing under and over adjacent intersecting bars to produce a structure having alternate concave and convex form, the intersecting cross-bars being united integrally together at their points of intersection, a mass of active paste filling the spaces between the horizontal and vertical cross-bars and filling the troughs in the cross-bars which alternate back and forth from one face of the plate to the other, thereby providing a substantially uniform distribution of paste which is interlocked with the cross-bars to produce a flexible structure and durable plate, and a lug operatively associated with the frame for establishing an electric connection between the active paste via the cross bars to an external circuit.

4. A relatively thin plate of the character set forth in claim 2 in which the cross-bars have approximately an elliptical cross section.

OTTO E. HUEBNER.